(12) United States Patent
Busuttil et al.

(10) Patent No.: US 7,549,667 B2
(45) Date of Patent: Jun. 23, 2009

(54) TRAILER PERSONNEL LIFT WITH RETRACTABLE AXLES

(75) Inventors: John Joseph Busuttil, Bothell, WA (US); Steven Citron, Maumee, OH (US)

(73) Assignee: Bil-Jax, Inc., Archbold, OH (US)

( * ) Notice: Subject to any disclaimer, the term of this patent is extended or adjusted under 35 U.S.C. 154(b) by 485 days.

(21) Appl. No.: 11/295,012

(22) Filed: Dec. 6, 2005

(65) Prior Publication Data

US 2007/0125581 A1 Jun. 7, 2007

(51) Int. Cl.
*B60D 1/54* (2006.01)
*B62D 61/12* (2006.01)

(52) U.S. Cl. .............. 280/491.1; 280/491.2; 280/656; 180/209; 180/906

(58) Field of Classification Search .............. 180/24.02, 180/209, 906; 182/2.1–2.11; 212/301; 280/405.1, 280/415.1, 491.1, 491.2, 656
See application file for complete search history.

(56) References Cited

U.S. PATENT DOCUMENTS

| | | | | | |
|---|---|---|---|---|---|
| 5,934,409 | A | * | 8/1999 | Citron et al. | 182/18 |
| 6,065,621 | A | * | 5/2000 | Fatemi et al. | 212/301 |
| 6,119,882 | A | * | 9/2000 | Crook et al. | 212/301 |
| 6,173,810 | B1 | | 1/2001 | Citron et al. | |
| 6,325,403 | B1 | * | 12/2001 | Brutger | 280/444 |
| 7,216,896 | B1 | * | 5/2007 | McGhie et al. | 280/789 |
| 2006/0284397 | A1 | * | 12/2006 | Lambert | 280/491.1 |

* cited by examiner

*Primary Examiner*—Paul N Dickson
*Assistant Examiner*—Marc A Scharich
(74) *Attorney, Agent, or Firm*—Townsend and Townsend and Crew LLP

(57) ABSTRACT

A trailer having retractable wheels. A lock-out mechanism is provided that prevents the trailer from being connected to a vehicle when the wheels are in the retracted position. The lock-out mechanism may also be configured to prevent movement of the wheels to the retracted position when the trailer is connected to a vehicle.

23 Claims, 6 Drawing Sheets

US 7,549,667 B2

TRAILER PERSONNEL LIFT WITH RETRACTABLE AXLES

TECHNICAL FIELD OF THE INVENTION

This invention is directed to trailers, and more specifically, to a trailer with retractable axles.

BACKGROUND OF THE INVENTION

Personnel lifts, sometimes called "cherry pickers," are useful for raising a worker for painting, building repair, tree-trimming, or other tasks that are typically out of reach. A typical personnel lift includes a work platform upon which one or more workers stand, and a boom for raising the work platform.

Although many construction companies own personnel lifts, a large segment of the market is in rental for personal or business use. A popular rental is for painting of a house, although a personnel lift may be rented for a number of different jobs.

A popular type of personnel lift, especially in rental markets, is a trailer personnel lift. A trailer personnel lift is a personnel lift that is mounted on a trailer and that can be towed behind a vehicle, for example with a conventional trailer hitch ball. By mounting the personnel lift on a trailer, the personnel lift does not have to be loaded onto a truck or transport trailer, saving time and cost. Once the trailer personnel lift is towed to a worksite, the personnel lift is ready for stabilization, leveling, and use.

Although conventional trailer personnel lifts work well for their intended purpose, the lifts are often too wide to fit through a narrow opening, such as a gate. This can be an inconvenience, particularly in large urban markets where lots are small, and privacy fences surround the yards. Often, the only access into a back yard is through a narrow opening, such as a gate or a typical 36-inch wide doorway through a garage. If a user is unable to get a trailer personnel lift into a fenced yard, the user may opt not to rent the personnel lift for a task such as painting of a house, because the personnel lift cannot be positioned to access the entire perimeter of the house.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, a trailer is provided having retractable wheels and axles. In accordance with an additional embodiment, a lock-out mechanism is provided that prevents the trailer from being connected to a vehicle when the wheels are in the retracted position. In yet another embodiment, the lock-out mechanism is configured to prevent movement of the wheels to the retracted position when the trailer is connected to a vehicle.

In accordance with an embodiment, the lock-out mechanism prevents retraction of the wheels when the trailer is connected to a vehicle for towing (e.g., connected to a trailer hitch ball on a vehicle). In addition, the lock-out mechanism prevents the coupler of the trailer from being attached to a trailer hitch when the wheels are in the retracted position.

In accordance with an embodiment, action of the lock-out mechanism is mechanically linked to retraction of the wheels for the trailer. In an embodiment, the lock-out mechanism serves to obstruct movement of the wheels towards the retracted position when the lock-out mechanism is in a first position. In this first position, the lock-out mechanism does not interfere with towing of the trailer.

In accordance with an embodiment, when the lock-out mechanism is in the second position, the axles are free to retract. However, when in the second position, the lock-out mechanism obstructs the coupler for the trailer, preventing a trailer hitch from being attached to the coupler. In accordance with an embodiment, movement of the lock-out mechanism to the second position is prevented if the trailer coupler is already attached to a trailer hitch.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
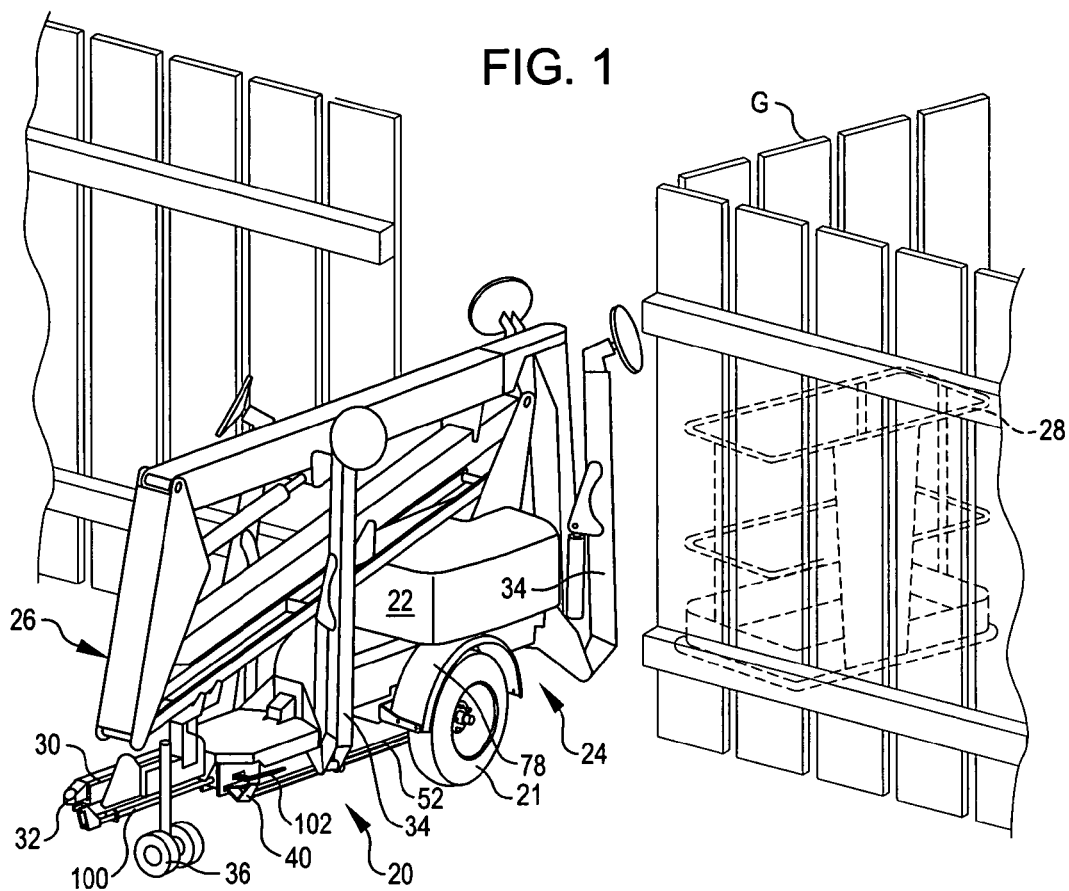
FIG. 1 is a side perspective view of a trailer personnel lift in accordance with an embodiment of the present invention, with wheels for the trailer personnel lift retracted, and a work platform of the personnel lift removed.
Figure 2:
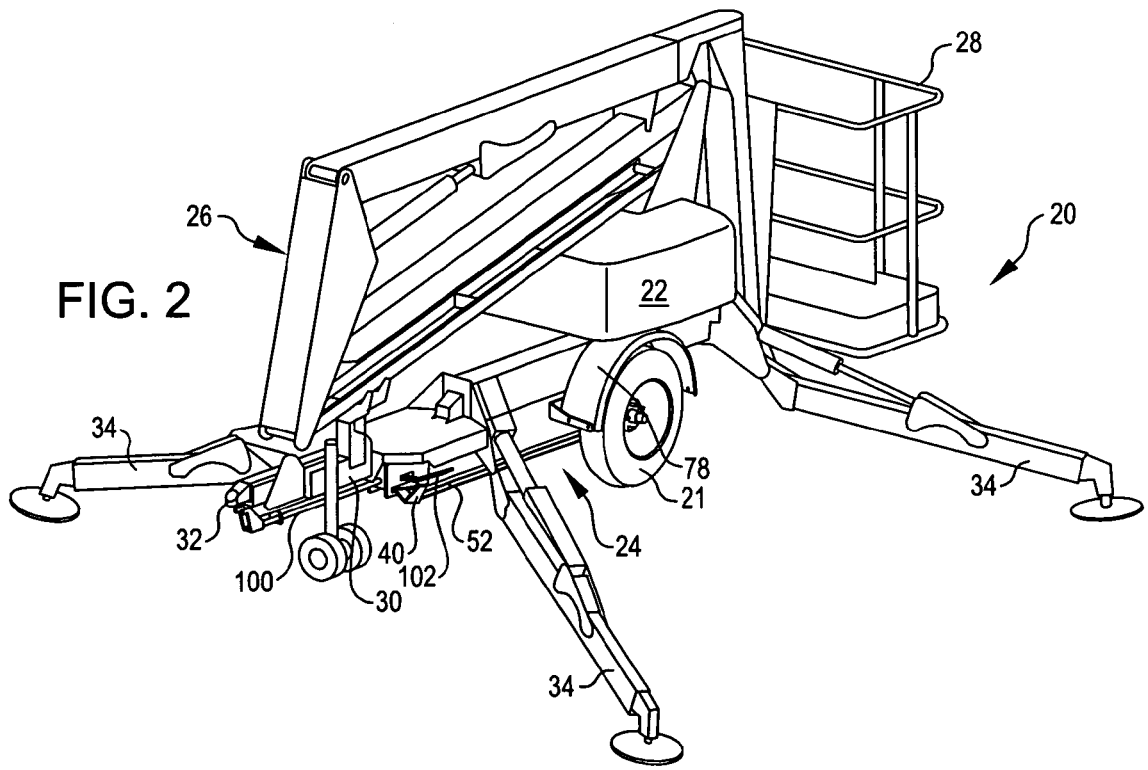
FIG. 2 is a side perspective view of the trailer personnel lift of FIG. 1, with outriggers for the trailer personnel lift extended, and the wheels retracted.
Figure 3:
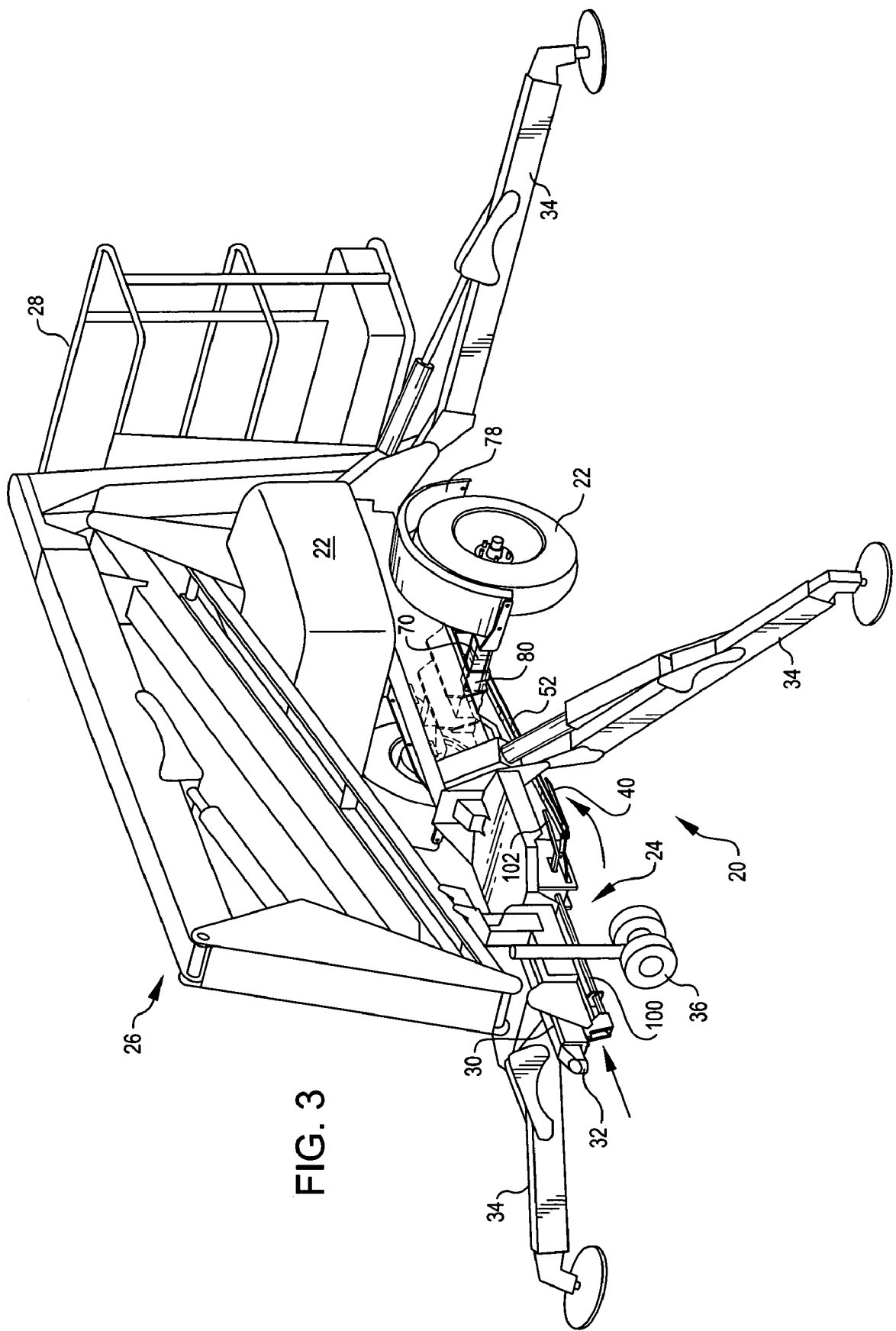
FIG. 3 is a side perspective view of the trailer personnel lift of FIG. 1, with the outriggers extended and the wheels extended.

Referring now to the drawings, in which like reference numerals represent like parts throughout the several views, FIG. 1 shows a trailer personnel lift 20 in accordance with an embodiment of the invention. Briefly described, the trailer personnel lift 20 is configured so that wheels 21 for the trailer personnel lift 20 may be retracted, permitting the trailer personnel lift 20 to be pushed through a narrow opening, such as the gate G shown in FIG. 1. In addition, as is further described below, in accordance with an embodiment, a lock-out mechanism is provided for the trailer personnel lift 20 that prevents the trailer personnel lift 20 from being attached to a vehicle for towing when the wheels 21 are in the retracted position. In an additional embodiment, the lock-out mechanism is configured to prevent movement of the wheels 21 to the retracted position when the trailer personnel lift 20 is connected to a vehicle.

In the embodiment shown in the drawings, the trailer personnel lift 20 includes a turn table 22 mounted on a trailer 24. A Z-type boom 26 is connected to the turntable at one end and to a work platform 28 on the other end. Although a Z-type boom 26 is shown in the drawings, other kinds of booms may be used. In addition, although a two-person work platform 28 is shown, other work platforms may be used.

Briefly described, the trailer personnel lift 20 is designed such that it may be towed by a vehicle coupled to the trailer 24. Upon reaching a desired location, the trailer personnel lift 20 is stabilized and leveled. After leveling, a worker can enter the work platform 28 and operate controls (not shown) to energize elements of a lift system (also not shown, but typically contained within the turn table 22) that extend the Z-boom 26 to lift the work platform 28. The operation and structure of such a lift assembly to raise and move a work platform, such as the work platform 28, to a desired height and location are known. However, in accordance with an embodiment, a novel retraction system for the wheels 21 is provided. Another embodiment is directed to the lock-out system for the retraction system and/or towing of the trailer.

The trailer 24 shown in the drawings includes a trailer tongue 30 having a trailer coupler 32 at one end. The trailer coupler 32 may be a conventional, straight, ball-cup type trailer coupler, an A-frame coupler, a pintle coupling, or another suitable structure for connecting to a vehicle. Typically, the coupler 32 is the forward-most part of a trailer tongue, such as the tongue 30, that envelopes and secures to a tow vehicle trailer hitch ball (not shown). However, other structures may be used for the coupler 32 of the trailer 24, or as the attachment structure on the vehicle. As an example, pintle hooks may be used in the connection between a vehicle and a trailer 24.

The trailer personnel lift 20 includes outriggers 34 mounted about the trailer 24. In the embodiment shown, four outriggers 34 are utilized. These outriggers may be automatically or manually set, and are used to level and stabilize the trailer personnel lift 20 in a manner known in the art.

The trailer 24 includes front wheels 36 attached at the tongue 30. In a manner known in the art, the front wheels 36 may be lowered to support the tongue end of the trailer 24, and may be raised for storage during towing of the trailer. In addition, the front wheels 36 permit a user to push or pull the trailer 24 on the front wheels 36 and the rear wheels 21, and to rotate the front wheels as needed to direct steering of the trailer 24.

Figure 4:
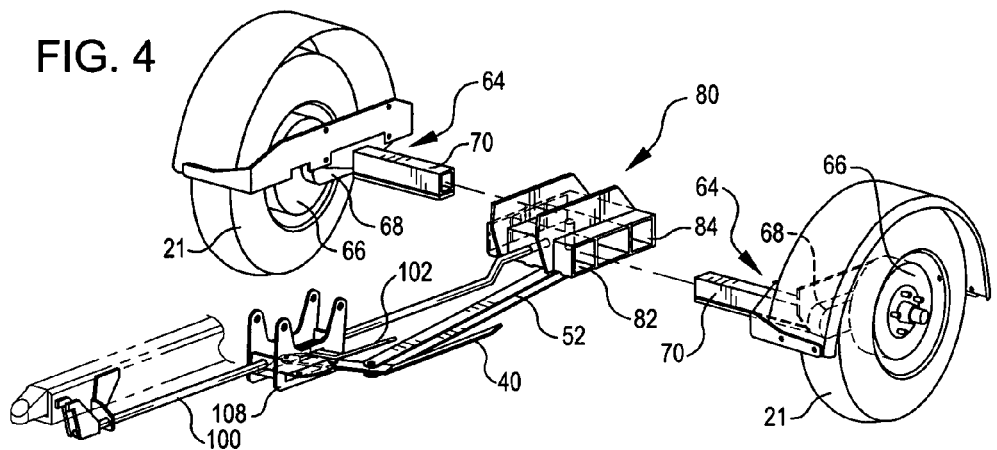
FIG. 4 is an exploded side perspective view of an axle retraction mechanism for the trailer personnel lift of FIG. 1.
Figure 6:
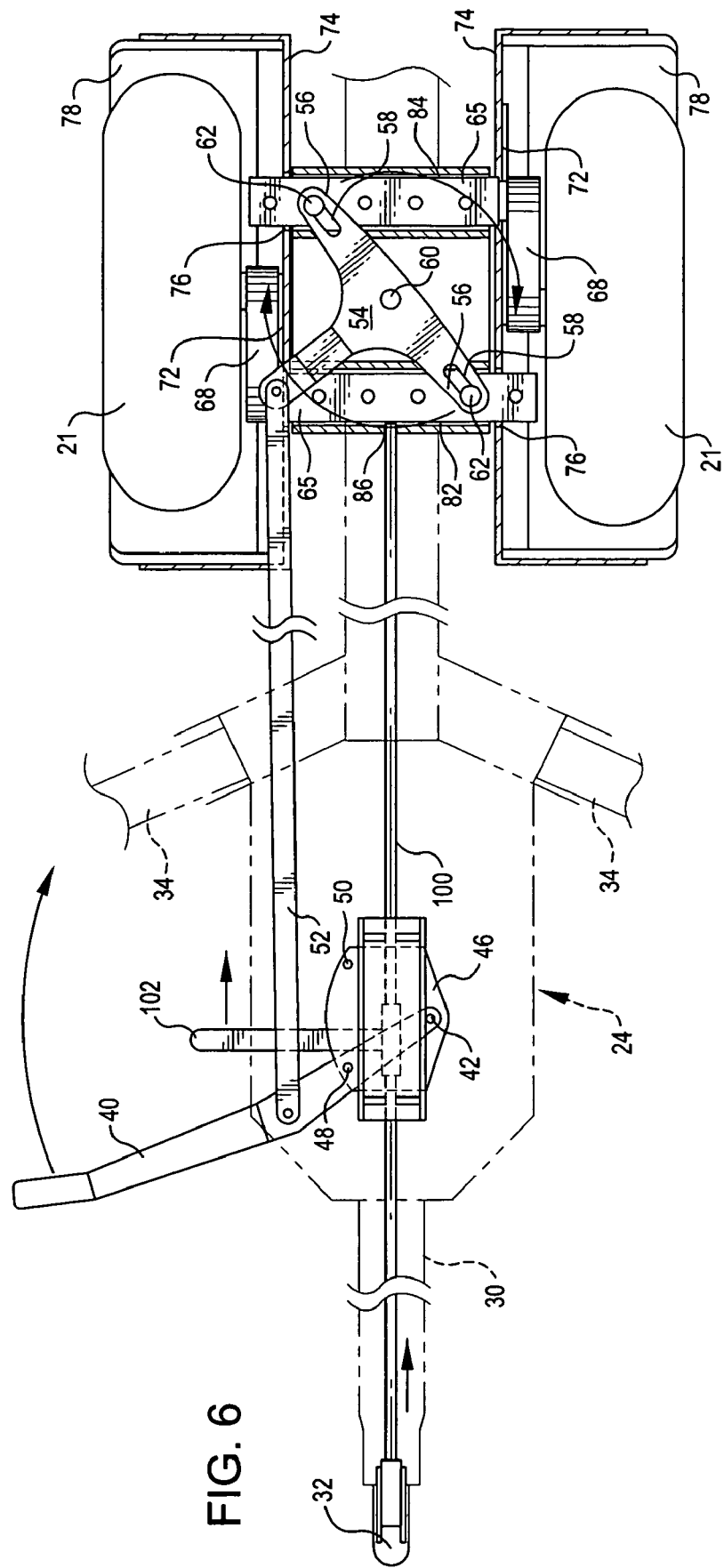
FIG. 6 is a bottom view of the trailer of FIG. 1, with parts removed for detail, and the wheels retracted.

FIG. 4 shows details of a retraction mechanism for the wheels 21 in accordance with an embodiment. In the embodiment shown in the drawings, the retraction mechanism includes a lever 40 connected via a pin 42 (FIG. 6) to a stationary lever plate 46. The lever plate 46 may be, for example, attached to the tongue 30 of the trailer 24. The lever 40 may rotate about the pin 42 and along the lever plate 46, and is lockable at two lock-in points 48, 50 (FIG. 6). The lock-in points 50, 48 may each be, for example, a spring plunger, a bolt, a latch, or another suitable releasable lock for holding the lever 40 in place.

A linkage arm 52 is attached to the lever 50. The linkage arm 52 extends to a cam plate 54 mounted between the wheels 21 and underneath the trailer 24. The cam plate 54 includes a pair of wings 56, each having a slot 58. A stationary pin 60 (FIG. 6) is centered between the wings 56, and the cam plate 54 is rotatably mounted about this stationary pin 60.

Shoulder bolts 62 extend upward through the slots 58 on the cam plate 54. The shoulder bolts 62 are attached to stub axles 64, for example, at slide plates 65 mounted on bottoms of the stub axles 64.

The stub axles 64 include a brake disc 66 to which the associated wheel 21 is attached. The brake disc 66 is attached to a torsion arm 68 which in turn is attached to a tube 70. The slide plates 65 are attached to a bottom side of the tubes 70.

A connector plate 72 is attached to and extends upward from the torsion arm 68. A fender mount bracket 74, shaped much like a U, is attached to the connector plate 72. The fender mount bracket 74 includes a notch 76 at a lower, slightly off-centered position. A fender 78 attaches to each of the fender mount brackets 74.

Figure 5:
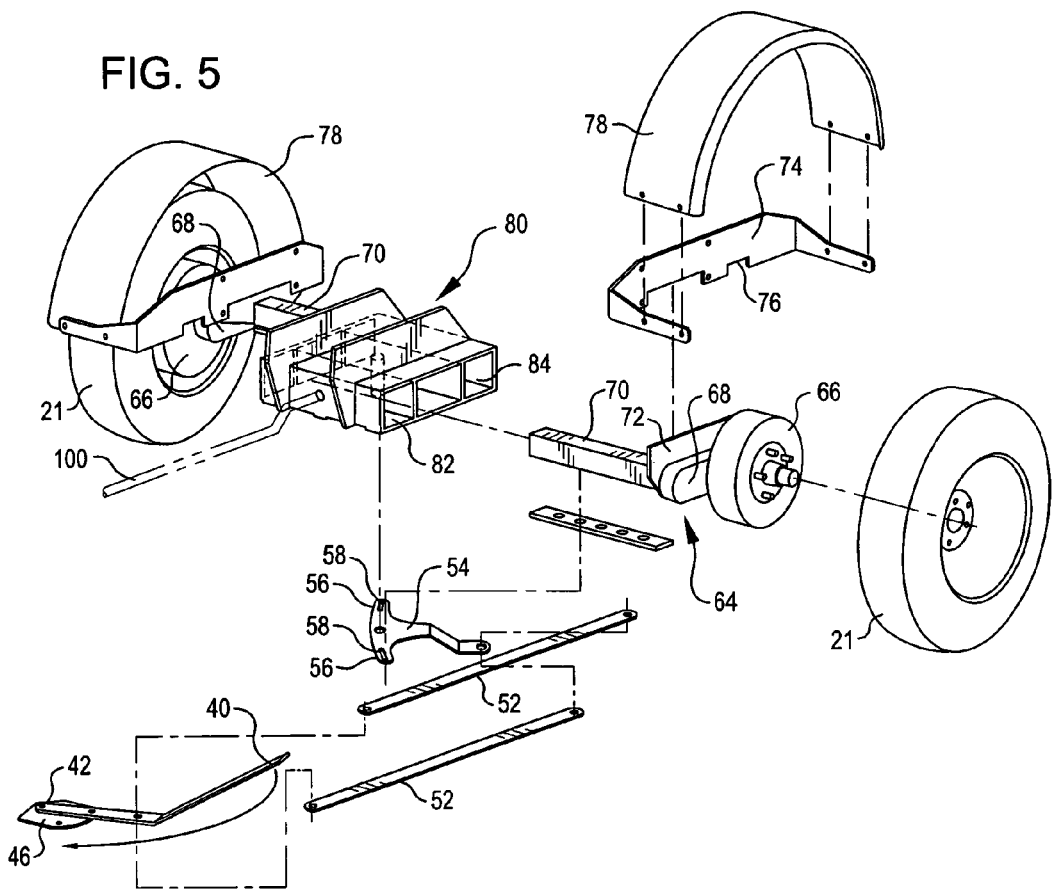
FIG. 5 is a further exploded side perspective view of the axle retraction mechanism of FIG. 4.

In embodiment shown in FIG. 5, an axle slide box 80 is provided having front and rear slide tubes 82, 84. The stub axle tubes 70 and the slide plates 65 extend into and are slidingly mounted within these slide tubes 82, 84. If desired, a low-friction material may be provided on the slide plates, the tubes 70, and/or the slide tubes 82, 84, so that the tubes 70 may slide through the slide tubes 82, 84 with little resistance. An opening 86 is provided on the front side of the axle slide box 80. Although not shown in the drawings, the slide box may include a lower plate having slots along which the shoulder bolts 62 may slide.

Figure 8:
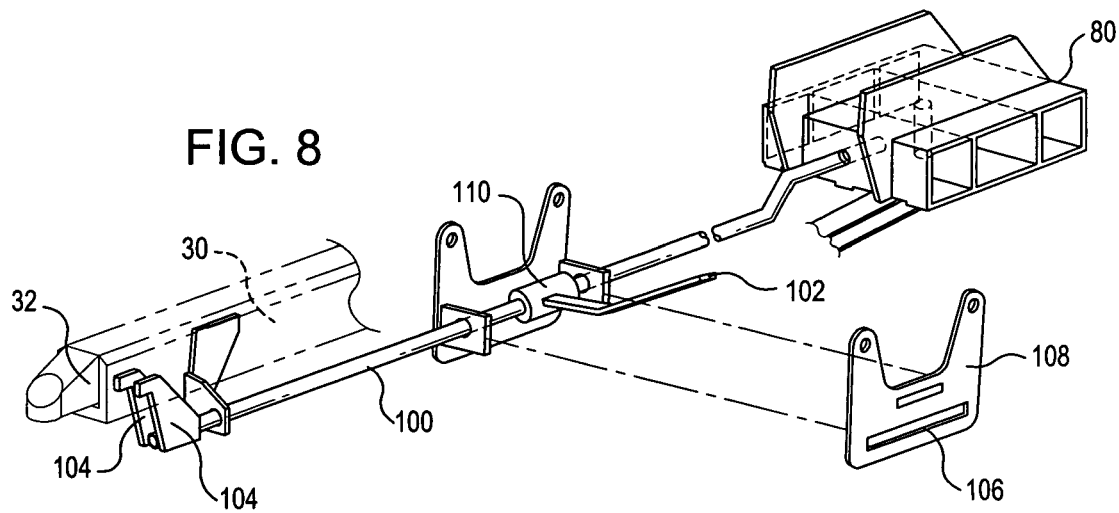
FIG. 8 is an exploded side perspective view of a lock-out mechanism for the trailer personnel lift of FIG. 1, with the lock-out mechanism in a position to lock the wheels in an extended position.
Figure 9:
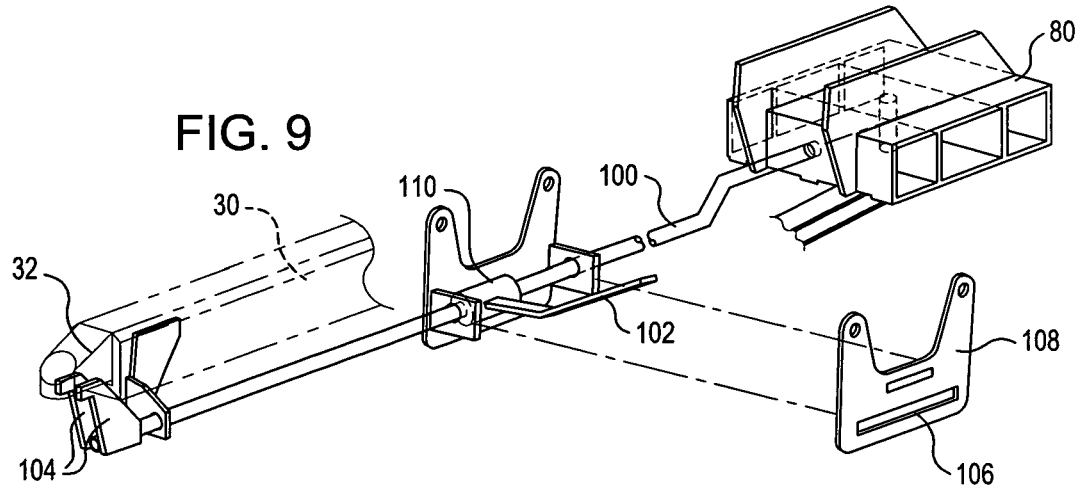
FIG. 9 is a side perspective view of the lock-out mechanism of FIG. 8, with the lock-out mechanism in a position to allow retraction of the axles and to obstruct a trailer coupler for the trailer personnel lift.

A lock-out bar 100 is mounted along the tongue and is axially movable along the tongue 30. The lock-out bar 100 includes a handle 102 (FIG. 8). As the lock-out bar 100 slides back and forth along the tongue 30, a rear end of the lock-out bar 100 extends into the opening 86 on the axle slide box 80. An opposite end of the lock-out bar 100 includes obstruction plates 104. These obstruction plates 104 are L-shaped brackets in the embodiment shown in the drawings, but could be configured in another manner.

As can be seen in FIG. 8, a handle 102 extends through a slot 106 on a slide plate 108. The handle 102 is attached to a connector 110, which in turn is attached to the lock-out bar 100. In the embodiment shown in the drawings, the handle 102 extends at a right angle to the lock-out bar 100, but other angles or connections may be used.

Figure 7:
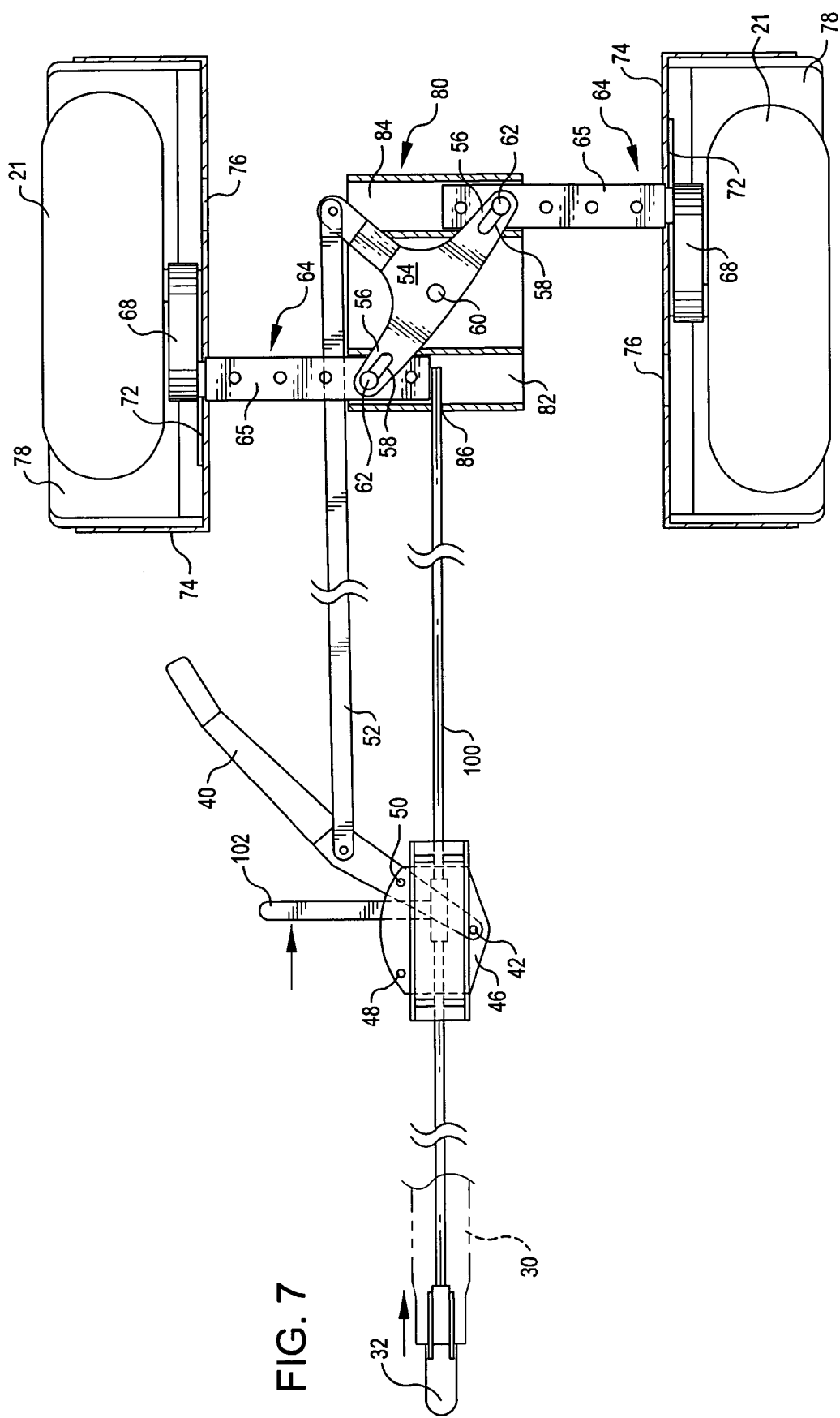
FIG. 7 is a bottom view of the trailer for the trailer personnel lift of FIG. 1, similar to FIG. 6, but with the wheels extended.

In operation, the trailer personnel lift 20 is towed (e.g., by a car with a hitch) with the wheels 21 in the extended position shown in FIG. 7. When the vehicle arrives at a work site, the trailer personnel lift 20 is detached from the vehicle. A user may then simply deploy the outriggers 34 to stabilize and level the trailer personnel lift 20, and then may enter the work platform 28 and utilize the trailer personnel lift 20 in a standard manner.

If the user desires to retract the axles 64 and the wheels 21, the user lifts the trailer 24 utilizing the outriggers 34. For the embodiment shown in the drawings, the lock-out bar 100 must first be moved before the wheels 21 can be retracted. When the stub axles 64 are in the extended state (FIG. 7) the rear end of the lock-out bar 100 extends behind the front stub axle 64, preventing retraction of the front wheel 21. The rear wheel 21 is also prevented from retracting because of the connection of the front wheel 21 to the rear wheel 21 via the cam plate 54.

When the lock-out bar 100 is in the rearward position, the obstruction plates 104 are removed from the trailer coupler 32, permitting a trailer hitch ball to be attached to or removed from the trailer coupler. Prior to retraction of the wheels 21, the trailer coupler 32 must be removed from a trailer hitch ball or other suitable trailer hitch. If the trailer coupler 32 is not removed, then the lock-out bar 100 cannot be moved forward so as to move the rear end of the lock-out bar 100 from behind the front stub axle 64. This movement is not permitted when the trailer 24 is attached to a vehicle because the obstruction plates 104 would engage the trailer hitch ball if a user attempted to move the lock-out bar 100 forward (i.e., toward the trailer coupler 32).

After the user has released the trailer coupler 32 from a vehicle (e.g., by releasing the trailer coupler from a trailer hitch ball), the user is free to slide the lock-out bar 100 forward using the handle 102. This movement removes the rear end of the lock-out bar 100 from behind the front stub axle tube 70, which frees the front stub axle 64 for movement along the front slide tube 82 of the axle slide box 80.

With the rear end of the lock-out bar 100 removed from behind the front stub axle tube 70, a user may retract the wheels 21 and the stub axles 64. One manner of retracting the wheels 21 is by use of the lever 40. As shown in FIG. 7, when the wheels 21 are extended, the lever 40 is at a rearward position and the cam plate 54 is positioned as shown in the drawings so that the stub axles 64 are fully extended. To retract the stub axles 64 and the wheels 21, the user releases the lock-in point 50, permitting use of the lever 40.

After the lock-in point 50 is released, the user may pull the lever 40 forward, causing the lever 40 to rotate about the pin 42. The lever 40 is connected to the cam plate 54 via the linkage arm 52. The lever 40 provides a mechanical advantage to rotation of the cam plate 54 by the connection of the linkage arm inside a gripping portion of the lever, and the attachment of the linkage arm to an outer portion of the cam plate 54.

As the user pulls the lever 40 toward the front of the trailer 24, the cam plate 54 rotates. This rotation causes the wings 56 of the cam plate 54 to pull the stub axles 64 inward. During this movement, the shoulder bolts 62 slide along the slots 58 in the cam plate 54 (and also along slots in the bottom of the axle slide box 80, if present). Eventually, the stub axles 64 are pulled inward to the positions shown in FIG. 6. At these positions, the ends of the tubes 70 for the stub axles 64 extend into the notches 76 on the fender mount brackets 74. This arrangement is provided for maximum compaction of the wheels 21 and the stub axles 64. In an embodiment, when the wheels 21 are pulled in as shown in FIG. 6, the outer edges of the wheels 21 and the entire trailer personnel lift 20 are no wider than 34 inches. In this manner, a user may push the trailer personnel lift 20 on the front wheels 36 and the wheels 21 through an opening that is slightly wider than 34 inches, for example a gate (e.g., the gate G) that is 36 inches wide.

To maintain the wheels 21 in the fully retracted position, the lever 40 may be locked, for example using the lock-in point 48. When the wheels 21 are fully retracted, the lock-out bar 100 may not be moved to the rearward position, because the rear end of the bar is blocked from entering the axle slide box 80 by the presence of the front stub axle 64 in the front slide tube 82. In this position, because the lock-out bar 100 cannot slide rearward, the obstruction plates 104 cannot be removed from the trailer coupler 32. As such, a user is blocked from inserting a trailer hitch ball into the trailer coupler 32. Thus, a user cannot connect the trailer 24 to a vehicle so as to tow the trailer personnel lift 20 when the wheels 21 are in the retracted position.

After the wheels 21 are fully retracted, the user may lower the trailer personnel lift 20 using the outriggers 34. Then, as described above, the trailer personnel lift 20 may be pushed around on the front wheels 36 and the rear wheels 21. Because the wheels 21 are fully retracted, the trailer personnel lift 20 may be pushed through a narrow opening.

To move the retracted wheels 21 to the extended position, the trailer personnel lift 20 is raised by the outriggers 34 and a user reverses the process. That is, the user releases the lever 40 from the lock-in point 48, and pulls or pushes the lever 40 in the rearward direction, rotating the cam plate 54 and forcing the stub axles 64 and the wheels 21 outward. The lever 40 may then be locked at the lock-in point 50, and the lock-out bar 100 may be pulled rearward.

Other embodiments are contemplated. For example, the wheels may be retracted using a hydraulic system, or by a user directly pushing on one or both of the individual wheels 21. Other methods or mechanisms may be used. However, use of the cam plate 54 and the lever 40 provides a simple, clean way of retracting the wheels 21. Moreover, because the lever 40 is mechanical and does not rely upon electric power, retraction or extension of the wheels may occur without power to the trailer personnel lift 20. Thus, a user may extend the wheels 21 even after a power failure of the trailer personnel lift 20.

The cam plate 54 provides another advantage. As can be seen in FIG. 7, the cam plate 54 provides a mechanical disadvantage to one of the wheels 21 trying to push the other wheel inward. That is, the offset that the cam plate 54 provides between the connections of the two stub axles 64 provides a mechanical disadvantage to pushing of one stub axle inward to cause retraction of the other. In addition, if the trailer were going around a corner, although the tendency of the inner wheel 21 would be to move inward, the tendency of the outer wheel 21 would be to go outward, and the forces would be offset.

The functions of the lock-out bar 100 may be provided in a number of different ways other than that shown in the drawings. As an example, an electrical lock-out providing the same function could be provided. However, such an electrical lock-out would rely on electrical power, and may not work in a situation where there is a power failure. Moreover, an electrical lock-out may provide an easy work-around for a user so that the user may still be able to tow the trailer personnel lift 20 with the wheels 21 in the retracted position, which is unsafe. Movement of the lock-out bar 100 may also be tied to movement of the retractable stub axles 64. As an example, a worm gear may be provided that causes movement of the lock-out bar 100 to the position where the trailer coupler 32 is blocked as the stub axles are retracted. Other mechanisms may be used to translate the movement of the retractable stub axles 64 with a lock-out bar.

To aid in passing the trailer personnel lift 20 through a narrow opening, the work platform 28 is easily releasable, for example by a pin (not shown). Thus, as shown in FIG. 1, the work platform 28 may be detached so that the trailer personnel lift 20 may be pushed through a narrow opening, such as the gate G. The work platform 28 may then be reattached for use of the trailer personnel lift 20.

The obstruction plates 104 may be substituted with any structure that is capable of blocking attachment of the trailer 24 to a vehicle. If a conventional trailer coupler 32 is used, such a structure may include anything that obstructs, blocks, or otherwise denies access to or use of the opening of the trailer coupler 24. Alternatively, obstruction may be provided by locking a lock for the trailer coupler. In addition, the lock-out bar 100 may be configured so as to rotate the trailer coupler 32 out of use, or to otherwise disable a trailer coupler.

The lock-out bar 100 preferably serves two functions, but not necessarily so. First, the lock-out bar prevents retraction of the stub axles 64 when the trailer 24 is connected to a vehicle. Second, the lock-out bar prevents attachment of the trailer 24 to a vehicle when the stub axles 64 and the wheels 21 are in the retracted position. Embodiments of the invention may provide only one of these two options. However, by providing both functions, the lock-out bar 100 effectively prevents towing of the trailer 24 when the wheels 21 are in the retracted position.

Although the invention has relevance to retractable axles for any trailer, the invention has particular relevance to personnel lifts that are mounted on trailers. Personnel lifts specifically benefit because the option to move a personnel lift through a gate or doorway provides a lot more options for use of the personnel lift, for example to allow the lift in a back yard so that the lift may be used to reach around an entire house. As such, the invention provides an option for use of a personnel lift that is not available without the invention, thus dramatically increasing the value of the personnel lift, particularly in a rental environment.

Other variations are within the spirit of the present invention. For example, although the invention is described with reference to use with a personnel lift 20, the axle retraction mechanism and/or lock-out mechanism of the present invention may be used with other trailers. In addition, instead of both sets of axles and wheels retracting, only one set may move. Also, the wheels 21 may retract in a different manner. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A trailer, comprising:
    retractable wheels movable between a first, retracted position defining a first width between the outer surfaces of the retractable wheels, and a second, extended position defining a second width between the outer surfaces of the retractable wheels, the second width being greater than the first width; and
    a tongue lock-out mechanism moveable between a locked position and an unlocked position, movement of the tongue lock-out mechanism from the locked position to the unlocked position being directly affected by whether the wheels are in the extended or retracted position such that, when the wheels are in the retracted position, movement of the tongue lock-out mechanism in normal operation is limited to the locked position where the trailer is prevented from being connected to a vehicle as a result of the wheels being in the retracted position.

2. The trailer of claim 1, wherein the trailer further comprises a trailer coupler, and wherein the tongue lock-out mechanism prevents the trailer from being connected to a vehicle as a result of the wheels being in the retracted position by preventing connection of a hitch to the trailer coupler.

3. The trailer of claim 2, wherein preventing connection of a hitch to the trailer coupler comprises at least one of blocking access to or use of the trailer coupler.

4. The trailer of claim 1, wherein the tongue lock-out mechanism is configured so that when the tongue lock-out mechanism is in the unlocked position and the wheels are in an extended position, the tongue lock-out mechanism prevents movement of the wheels to the retracted position as a result of the tongue lock-out mechanism being in the unlocked position.

5. The trailer of claim 4, further comprising at least one retractable axle connected to one of the retractable wheels, and wherein the lock-out mechanism in the unlocked position blocks retraction of said at least one retractable axle.

6. The trailer of claim 4, wherein the trailer further comprises a trailer coupler, and wherein the tongue lock-out mechanism prevents the trailer from being connected to a vehicle as a result of the wheels being in the retracted position by preventing connection of a hitch to the trailer coupler.

7. The trailer of claim 6, wherein preventing connection of a hitch to the trailer coupler comprises at least one of blocking access to or use of the trailer coupler.

8. The trailer of claim 1, wherein action of the tongue lock-out mechanism is mechanically linked to retraction of the wheels for the trailer.

9. The trailer of claim 1, wherein the tongue lock-out mechanism comprises a lock-out bar that is movable along the trailer from a first configuration where the lock-out bar blocks retraction of the wheels and a second configuration where the wheels are free to retract.

10. The trailer of claim 9, further comprising a trailer coupler, and wherein at least one of access or use of the trailer coupler is blocked by the lock-out bar when in the second configuration.

11. The trailer of claim 10, wherein the lock-out bar is prevented from moving to the second configuration when the trailer coupler is attached to a hitch.

12. The trailer of claim 11, wherein the lock-out bar is prevented from moving to the second configuration by the hitch blocking the movement.

13. The trailer of claim 1, further comprising a lever connected to the retractable wheels and configured to move the retractable wheels between the first and second positions with a mechanical advantage.

14. The trailer of claim 1, further comprising a personnel lift mounted on the trailer.

15. A trailer, comprising:
retractable wheels movable between a first, retracted position defining a first width between the outer surfaces of the retractable wheels, and a second, extended position defining a second width between the outer surfaces of the retractable wheels, the second width being greater than the first width; and
a wheel lock-out mechanism moveable between a retraction-blocking position and a retraction-permitting position, movement of the wheel lock-out mechanism from the retraction-blocking position to the retraction-permitting position being directly affected by whether the trailer is connected to a vehicle such that, when the trailer is connected to a vehicle, the wheel lock-out mechanism in normal operation is limited to the retraction-blocking position where the wheels are prevented from being moved to the retracted position as a result of the trailer being connected to a vehicle.

16. The trailer of claim 15, wherein action of the wheel lock-out mechanism is mechanically linked to retraction of the wheels for the trailer.

17. The trailer of claim 15, wherein the wheel lock-out mechanism comprises a lock-out bar that is movable along the trailer from a first configuration where the lock-out bar blocks retraction of the wheels and a second configuration where the wheels are free to retract.

18. The trailer of claim 17, wherein the lock-out bar is prevented from moving to the second configuration when the trailer coupler is attached to a hitch.

19. The trailer of claim 18, wherein the lock-out bar is prevented from moving to the second configuration by the hitch blocking the movement.

20. The trailer of claim 15, further comprising a lever connected to the retractable wheels and configured to move the retractable wheels between the first and second positions with a mechanical advantage.

21. The trailer of claim 15, further comprising a personnel lift mounted on the trailer.

22. A trailer, comprising:
retractable wheels movable between a first, retracted position defining a first width between the outer surfaces of the retractable wheels, and a second, extended position defining a second width between the outer surfaces of the retractable wheels, the second width being greater than the first width; and
a lever connected to the retractable wheels and configured to move the retractable wheels between the first and second positions by transmitting a first force on the lever over a first distance to a second force on the wheels over a second distance, the second distance shorter than the first distance so as to provide a mechanical advantage.

23. The trailer of claim 22, further comprising a personnel lift mounted on the trailer.

* * * * *